United States Patent [19]

Förster et al.

[11] 4,120,750
[45] Oct. 17, 1978

[54] NUCLEAR ENERGY PLANT WITH CLOSED WORKING GAS CIRCUIT

[75] Inventors: Siegfried Förster, Alsdorf; Peter Quell, Aachen-Haaren; Berthold Sack, Aachen, all of Fed. Rep. of Germany

[73] Assignee: Kernforschungsanlage Jülich Gesellschaft mit beschränkter Haftung, Jülich, Fed. Rep. of Germany

[21] Appl. No.: 641,538

[22] Filed: Dec. 17, 1975

[30] Foreign Application Priority Data

Dec. 19, 1974 [DE] Fed. Rep. of Germany ....... 2460165

[51] Int. Cl.² .............................................. G21D 5/08
[52] U.S. Cl. ....................................... 176/60; 176/65; 60/644; 60/698
[58] Field of Search ................... 60/644, 698; 176/60, 176/61, 65, 87

[56] References Cited

U.S. PATENT DOCUMENTS

| | | | |
|---|---|---|---|
| 3,287,226 | 11/1966 | Webb | 176/65 X |
| 3,402,102 | 9/1968 | Kagi | 176/65 |
| 3,656,566 | 4/1972 | Coast et al. | 176/60 X |

FOREIGN PATENT DOCUMENTS 2,038,375  8/1970  Fed. Rep. of Germany ............ 176/65

*Primary Examiner*—Allen M. Ostrager
*Attorney, Agent, or Firm*—Walter Becker

[57] ABSTRACT

A nuclear energy plant with a closed circuit for the working gas, in which a nuclear reactor operable to heat up the working gas, is through a plurality of gas conduits arranged in parallel, connected to a plurality of turbo-sets for generating electric energy and to circuit components following the turbo-sets. One turbo-set each and the respective circuit components associated therewith are respectively arranged in common structural units which are radially arranged around the nuclear reactor. Each of the structural units comprises a first connection for a hot gas conduit withdrawing the heated working gas from the reactor and a second connection for a cold gas conduit for conveying the working gas to the nuclear reactor after the working gas has passed through the respective circuit components.

7 Claims, 3 Drawing Figures

NUCLEAR ENERGY PLANT WITH CLOSED WORKING GAS CIRCUIT

The present invention relates to a nuclear energy plant with closed circuit for the working gas, in which a nuclear reactor for heating the working gas is through gas conduits arranged in parallel connected to a plurality of electrical energy generating turbo sets and to circuit components following said turbo sets.

Nuclear energy plants with closed working gas circuits arranged in parallel are known. By this so-called plural loop construction, it is intended to divide into a plurality of working gas currents the quantities of gas adapted to be heated, in particular in high temperature reactors, in order to be able to insert into the plant circuit components which are intended for smaller quantities of gas and are adapted to be produced in a conventional design. Circuit components of this type do not only reduce the total costs which are required for the construction of nuclear energy plants but also permit a more economic operation.

A nuclear power plant with closed working gas circuits has become known in which within the prestressed concrete container which surrounds the nuclear reactor there is arranged in parallel a plurality of circuit components. However, the working gas heated in the nuclear reactor is conveyed to a single turbo set provided in a separate chamber below the nuclear reactor from which turbo set the working gas after having given off its energy flows into heat exchangers (Wärmeübertrager) arranged in parallel. A drawback in this nuclear energy plant is seen in the fact that in case of a repair of the turbo set becoming necessary, the entire plant has to be stopped. A further drawback of this known design consists in that due to the arrangement of the turbo set below the nuclear reactor, and also due to the arrangement of the heat exchanger within the prestressed concrete container surrounding the nuclear reactor, the guiding of the gas conduits is made more difficult and a relatively large space surrounded by pre-stressed concrete is created which considerably increases the costs of building the plant.

There has furthermore become known a nuclear energy plant with closed working gas circuit, in which the working gas is conveyed in a plurality of loops each of which comprises a turbo set as well as additional circuit components which are associated with the respective turbo set. The advantage realized with this nuclear energy plant by distributing the heated quantity of working gas to a plurality of gas circuits arranged in parallel, will be at the expense of a considerable increase in the volume of the pre-stressed concrete container in which the nuclear reactor and all components pertaining to the working gas circuit are mounted, and furthermore at the expense of required relatively long working gas conduits. A further advantage of this known nuclear energy plant consists in that the circuit components, in case of possible necessary repair, are accessible only under difficulties.

It is, therefore, an object of the present invention to provide a nuclear energy plant with closed working gas circuit which will overcome the above mentioned drawbacks and in which it will be possible to insert into the working gas circuit circuit components which are easy to produce and to handle and which are relatively small with regard to the power output of the nuclear reactor.

It is another object of this invention to provide a nuclear energy plant as set forth in the preceding paragraph in which possible necessary repairs to the circuit components can be carried out without difficulties and without having to interrupt or interfere with the operation of the nuclear energy plant.

These objects and advantages of the invention will appear more clearly from the following specification in connection with the accompanying drawings, in which.

Figure 1:
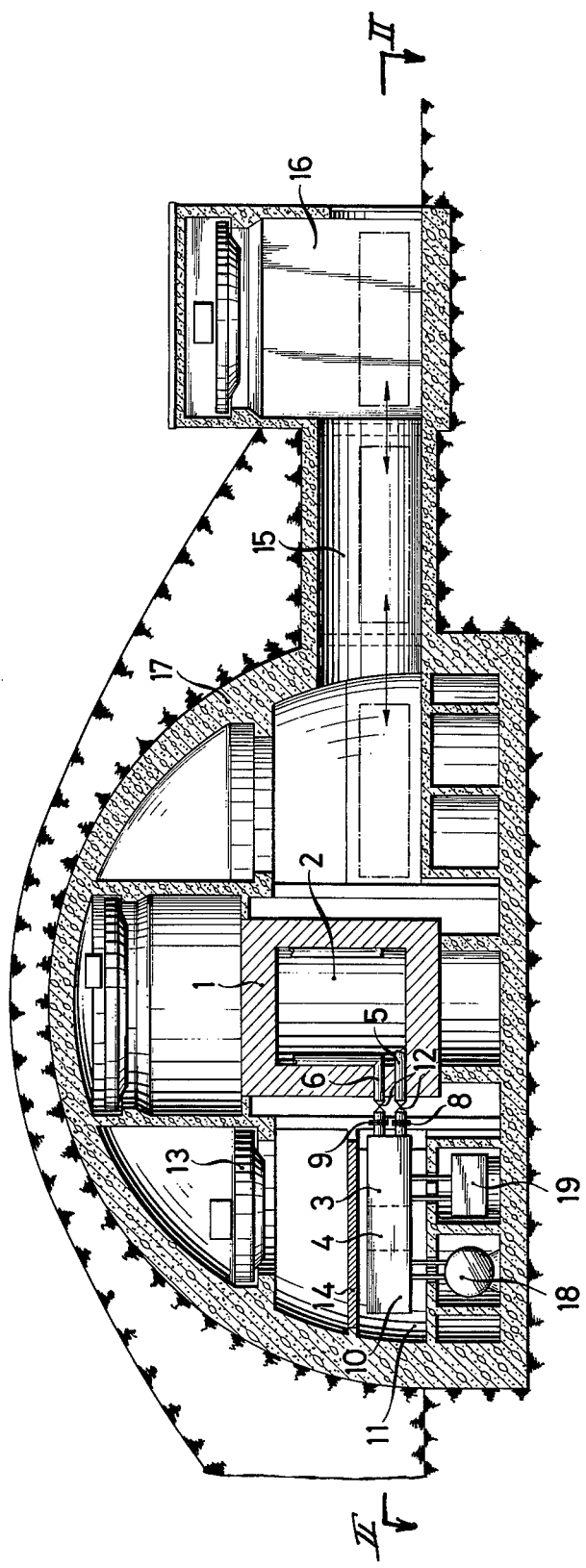
FIG. 1 is a longitudinal section through a nuclear energy plant according to the invention with a bowl-shaped safety container.

The above outlined objects have been realized with a nuclear energy plant according to the invention which is characterized primarily in that one turbo set each and the circuit components associated therewith are arranged in a common structural unit, and the structural units are in a star-shaped manner or radially arranged around the core reactor. Each of the structural units comprising one connection each have a hot gas conduit which withdraws the working gas from the nuclear reactor after the working gas has been heated, and one connection each for a cold gas conduit which conveys the working gas to the nuclear reactor after the working gas has passed through the circuit components. The combination of one turbo set each with the pertaining circuit component to form a structural unit, and the employment of a relatively great number of structural units makes possible in an advantageous manner an economic operation of nuclear energy plants. The coupling of the structural units to the nuclear reactors will be considerably simplified by the fact that between the nuclear reactor and each structural unit there are provided only hot gas and cold gas conduits. This has a cost-saving influence upon the construction of the nuclear energy plants because after the nuclear energy plant has been built up, prefabricated structural units can be connected thereto not only after the plant has been built but also during the operation of the plant. It is furthermore advantageous that the relatively high number of structural units arranged around the nuclear reactor permit the turning off and withdrawal of a repair requiring structural unit without materially interfering with the operation of the nuclear energy plant.

According to a further development of the invention, it is provided that at least one of the structural units form a reserve unit which can be employed directly as replacement when components of one structural unit should fail. Thus, also during the operation of the nuclear energy plant, regular routine inspections can be carried out.

A preferred embodiment of the nuclear energy plant consists in that the structural units are arranged in a horizontal position. In this way, a nuclear energy plant of reduced height will be created which means structural facilitations for the construction of the plant and the construction of a shallow bowl-shaped safety container which screens the nuclear energy plant toward the outside and which in view of its more favorable loadability in case of outside influences for the sake of safety will represent a great advantage.

An expedient design of the structural units in radial arrangement surrounding the nuclear reactor, consists in that the connection for the hot gas conduit as well as the connection for the cold gas conduit are provided on that end face of each structural unit which faces the nuclear reactor.

An improvement in the safety of the nuclear energy plant will be realized by arranging each structural unit in a separate chamber provided in the reactor pressure container. In this connection, the walls of the chambers serve as splinter protection in case circuit components of the structural units break. A cost-saving construction is at the same time obtainable when for receiving one structural unit each, chambers of normal concrete are arranged around the reactor pressure container. The volume of the reactor pressure container which consists of high-grade material such as pre-stressed concrete, is in this way considerably reduced.

The costs of a nuclear energy plant according to the invention are particularly relatively low when for the components of the working gas circuit to be inserted into the structural units, mass production parts can be employed. Inasmuch as the nuclear energy plant according to the invention permits the connection of a great number of structural units around the nuclear reactor, the employment of such components of the working gas circuit which components can be produced at low costs, will be possible without difficulties. It is furthermore advantageous that in view of the great number of structural units, sufficient redundancy is obtained so that a particular post heat withdrawal system for the turning-off process of the nuclear reactor will not be necessary with the nuclear energy plant according to the invention.

According to a further development of the invention, it is provided for completing the structural units that each structural unit includes a generator connected to the turbo set.

Referring now to the drawings in detail, a nuclear reactor 2 surrounded by a reactor pressure container 1 is located in the center of the nuclear energy plant. The working gas heated in the nuclear reactor 2 is conveyed in a plurality of loops to gas conduits arranged in parallel, in a closed working gas circuit.

Provided in each loop is one turbo set 3 for generating electrical energy, and further circuit components 4 in conformity with the working gas circuit, as well as recuperative heat exchangers and coolers. The working gas passes through hot gas conduits 5 to each turbo set 3. Cold gas conduits 6 are provided as return conduits for the working gas to the core reactor 2. The hot gas conduits 5 as well as the cold gas conduits 6 are passed through the reactor pressure container 1. The turbo sets 3 and the circuit components 4 of each loop are together arranged in structural units 7 which respectively have a connection 8 to one of the hot gas conduits 5, and a connection 9 for one of the cold gas conduits. For purposes of simplification, the structural units 7 have been illustrated as closed chambers while the confining lines indicated by dashes indicate zones into which there are respectively built in a turbo set 3 or circuit components 4. In an expedient manner, also generators 10 driven by the turbo sets 3 are arranged in the structural unit 7 of the embodiment of FIG. 1. The zones illustrated in the drawings are, however, selected purely diagrammatically. Actually, turbo set, circuit components, and generators are arranged according to space-saving aspects.

Figure 2:
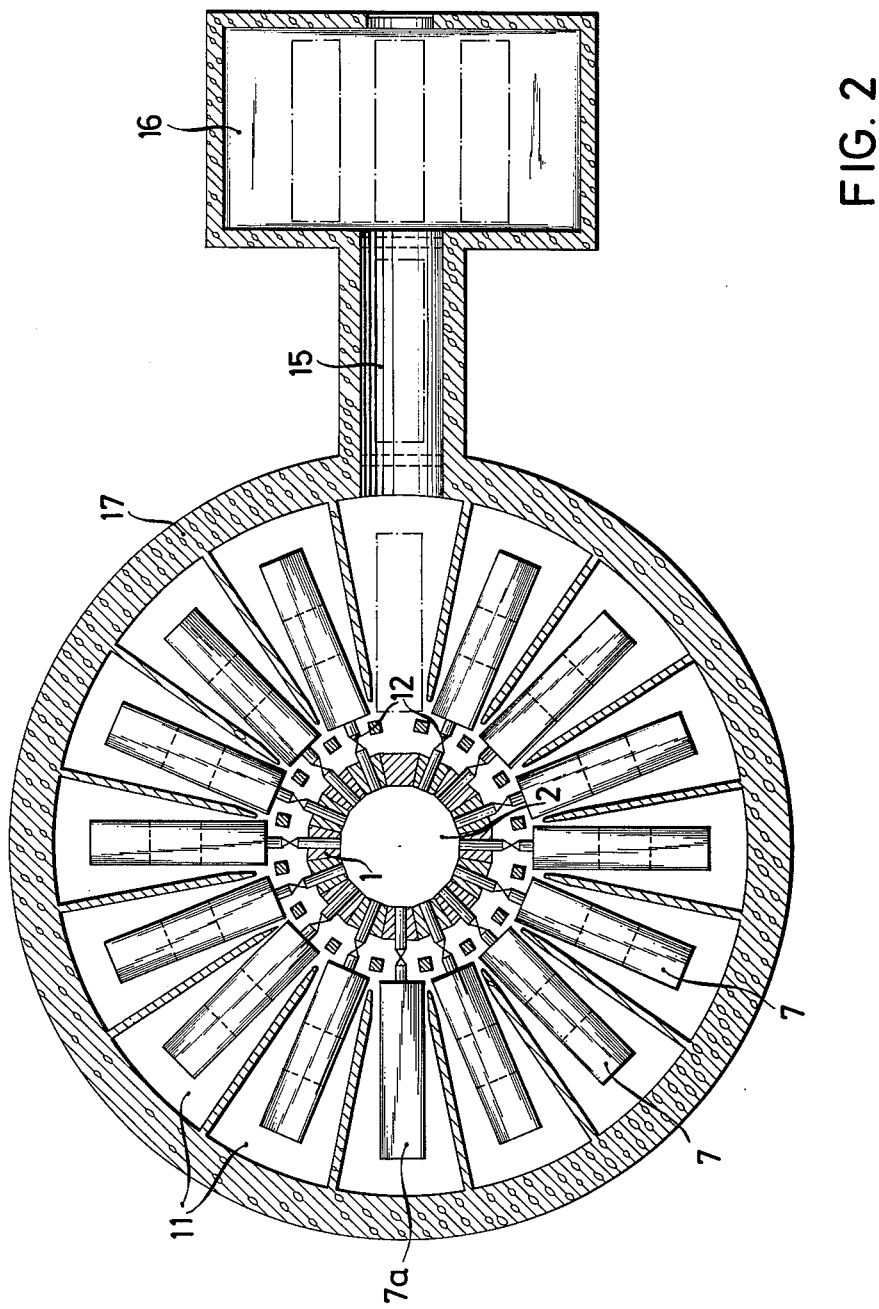
FIG. 2 is a section taken along the line II—II of FIG. 1.

The structural units 7 are arranged around the core reactor 2 in a star-shaped or radial manner (FIG. 2). This arrangement permits the connection of a relatively great number of individual structural units 7 in a space-saving manner. In the embodiment shown in the drawings, fourteen structural units 7a are provided. The structural units 7 are arranged horizontally adjacent the reactor pressure container, which fact makes possible a low structural height for the nuclear energy plant. Each structural unit 7 has been inserted into a separate chamber 11. According to the embodiment of FIG. 1, the chambers 11 consist of normal concrete which serves as splinter protection.

The particular advantage of the nuclear energy plant according to the invention consists primarily in that the individual structural units 7 can in a minimum of time be connected and disengaged. The connections 8,9 of the structural units 7 comprise shut-off valves 12. A removal of the structural units is not necessary when one of the components inserted into the structural units should fail and/or should have to be repaired; for such an instance, one of the structural units 7 is provided as reserve unit 7a. The reserve unit 7a will be connected when one of the structural units fails. For purposes of removing the repair requiring structural unit, there is within the nuclear energy plant provided a circulating crane 13. After lifting off a cover plate 14, the repair requiring structural units 7 are transported by the crane 13 from the chambers 11 to a lock chamber 15 through which the repair requiring structural units 7 can be passed into a repair shop 16. In the repair shop 16 there are expediently stocked structural units ready for operation as additional reserve units. The horizontal arrangement of the reserve units 7 around the nuclear reactor 2 will permit installing of the reactor pressure container 1 closely above the foundation of a safety container 17 which closes off the nuclear energy plant toward the outside, which assures safety even in case of an earthquake. The safety container 17 is covered by a fill or sand pile. In the safety container 17 below the chambers 11 there are provided additional chambers for the gas storage container 18, and for auxiliary systems 19 of the nuclear energy plant such as controls, venting devices, etc.

Figure 3:
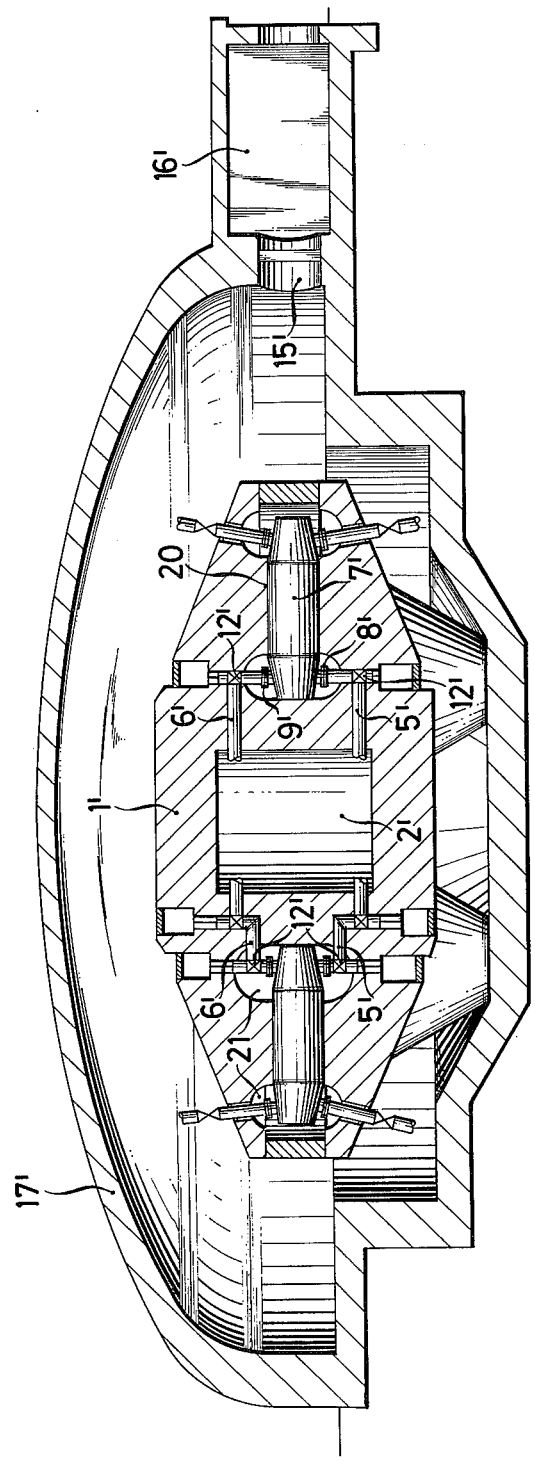
FIG. 3 is a longitudinal section through a nuclear energy plant in an integrated construction.

FIG. 3 shows an embodiment of a nuclear energy plant according to the invention in an integrated construction. The likewise horizontally arranged structural units 7' are insertable into separate chambers 20 of the reactor pressure container 1' which consists of pre-stressed concrete and which surrounds the core reactor 2'. The structural units 7' have their ends deformed in a truncated cone-shaped manner and here are provided with the connections 8', 9' for the hot gas conduit 5' and the cold gas conduit 6'. The connection of the structural units 7' is effected in respective chambers 21 into which the repairman can walk. The connections 8', 9' for the hot gas conduits and cold gas conduits 5', 6' respectively comprise each either a shut-off valve 12' or two shut-off valves arranged one behind the other. The nuclear energy plant is closed off toward the outside safety container 17'. The nuclear energy plant of FIG. 3, similar to the plant according to FIGS. 1 and 2 comprises a repair shop 16' which is accessible through a lock system 15'.

It is, of course, to be understood that the present invention is, by no means, limited to the specific showing in the drawings, but also comprises any modifications within the scope of the appended claims.

What we claim is:

1. A nuclear energy plant having a closed circuit for the working gas, which includes in combination: a nuclear reactor operated with a plurality of loops for working gas, each loop being formed as a structural unit comprising at least one turbo set for generating electric energy and circuit components for cooperation with said turbo set, said structural units radially surrounding said reactor in radially spaced relationship thereto, a plurality of first conduits respectively and independently of each other connecting said reactor with each structural unit for conveying hot working gas from said reactor to said turbo sets and subsequently through the respective pertaining circuit components, and a plurality of second conduits respectively and independently of each other leading from each structural unit to said reactor for conveying to said reactor working gas after the latter has passed through said circuit components and thereby has undergone a drop in temperature, said first conduit and said second conduit of each structural unit having connections comprising at least one shut-off valve to connect said unit with said reactor.

2. A nuclear energy plant in combination according to claim 1, in which at least one of said units is a reserve unit and is normally not connected to said reactor.

3. A nuclear energy plant in combination according to claim 2, in which said units occupy a horizontal position.

4. A nuclear energy plant in combination according to claim 3, in which the connections of said first and second conduits with the respective pertaining units are provided on that end face of said units which face said reactor.

5. A nuclear energy plant in combination according to claim 4, which includes a reactor pressure container surrounding said reactor and comprising a plurality of separate chambers respectively having said units arranged therein.

6. A nuclear energy plant in combination according to claim 4, which includes a reactor pressure container surrounding said reactor, and a plurality of separate chambers of normal concrete arranged around said reactor pressure container each of said chambers consisting of normal concrete.

7. A nuclear energy plant in combination according to claim 4, which includes a plurality of electric generators independent of each other and respectively arranged in said units, each of said turbo sets having one of said electric generators operatively connected thereto.

* * * * *